United States Patent [19]

Cantwell, Jr. et al.

[11] 4,360,811
[45] Nov. 23, 1982

[54] ADAPTIVE ZERO MEAN SYSTEM FOR CONTROLLING NOISE FALSE ALARM RATE

[75] Inventors: Thomas C. Cantwell, Jr., Yorba Linda; Richard D. Wilmot, Buena Park; Jack R. Ballantyne, Santa Ana, all of Calif.

[73] Assignee: Hughes Aircraft Company, Culver City, Calif.

[21] Appl. No.: 198,902

[22] Filed: Oct. 20, 1980

[51] Int. Cl.³ .............................................. G01S 7/02
[52] U.S. Cl. .................................. 343/7 A; 343/5 CF
[58] Field of Search ............................ 343/5 CF, 7 A

[56] References Cited

U.S. PATENT DOCUMENTS

| | | | |
|---|---|---|---|
| 3,761,922 | 9/1973 | Evans | 343/7 A X |
| 4,062,012 | 12/1977 | Colbert et al. | 343/5 CF X |
| 4,104,633 | 8/1978 | Donahue et al. | 343/5 CF X |
| 4,274,095 | 6/1981 | Phipps et al. | 343/5 CF X |

*Primary Examiner*—T. H. Tubbesing

*Attorney, Agent, or Firm*—W. J. Adam; W. H. MacAllister; A. W. Karambelas

[57] ABSTRACT

A false alarm control processor that receives sampled input radar video data and provides an output signal having a zero mean value. The processor accumulates the sample video for a range sweep of range bins, then stores the value and resets a counter. The stored value is scaled to form an estimate of the mean and subtracted from the input video signals of the following sweep. To prevent the mean from being biased by strong targets, a target exclusion function may be included to prevent accumulation of video from strong targets. However, if the noise or jamming level has increased for more range bins than a target would occupy, the video is then sampled by the accumulator so that the mean is responsive to changes in the level of the noise. Thus, the system provides a constant false alarm rate and accurate azimuth estimation in the azimuth integrator filter as well as allowing the azimuth integrator to operate with a relatively small dynamic range.

10 Claims, 6 Drawing Figures

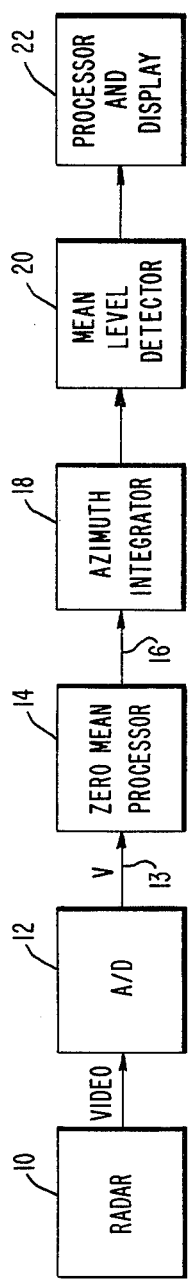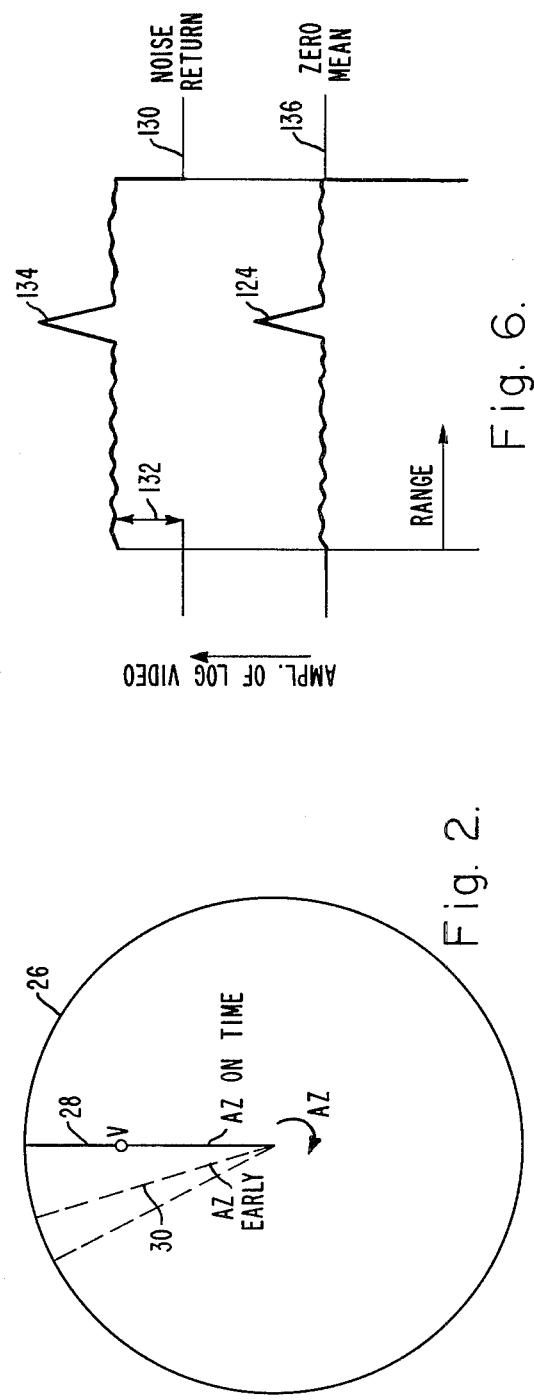

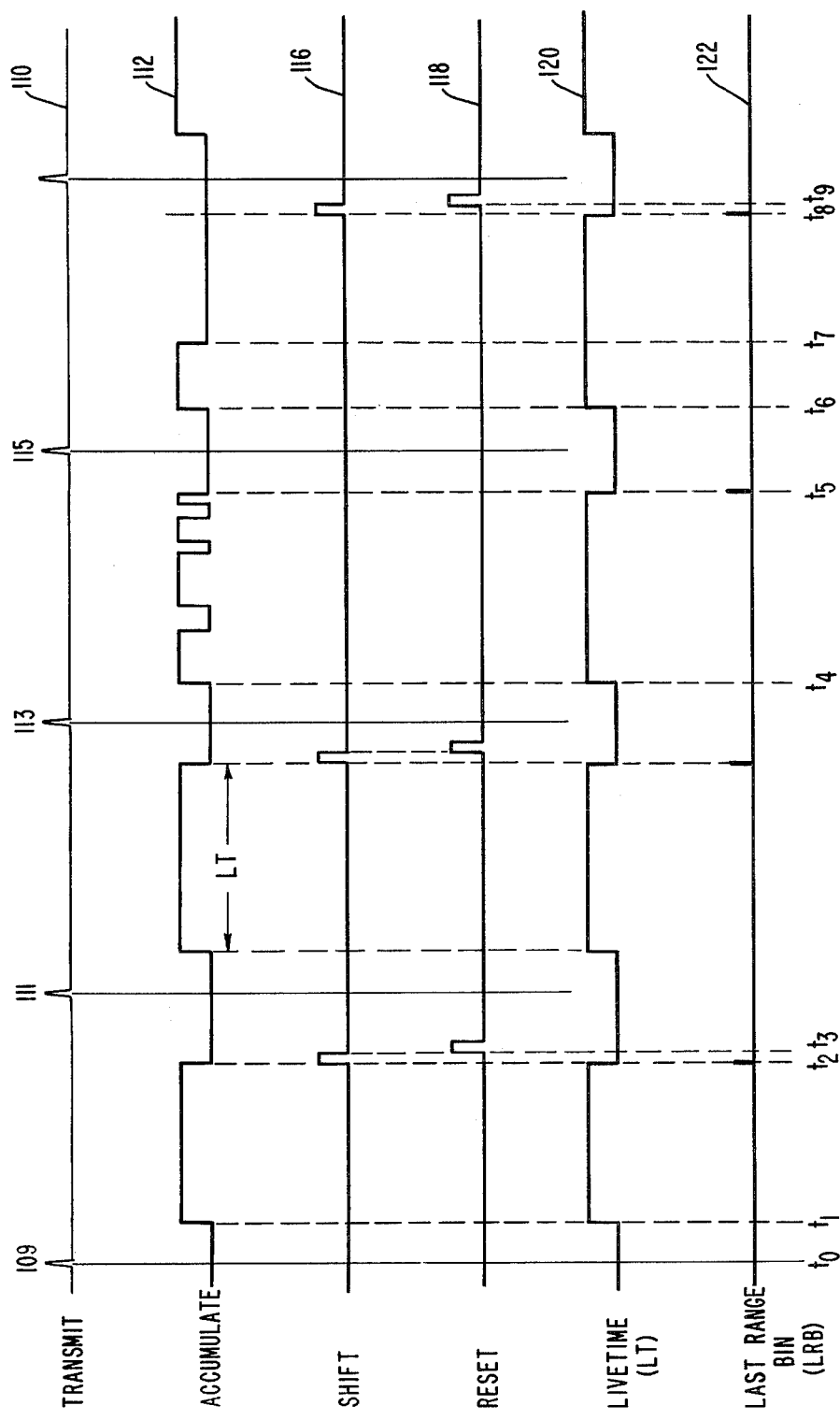

ADAPTIVE ZERO MEAN SYSTEM FOR CONTROLLING NOISE FALSE ALARM RATE

TECHNICAL FIELD

This invention relates to radar target detection systems and particularly to a noise false alarm control system utilizing an adaptive zero mean technique.

BACKGROUND OF THE INVENTION

1. Field of the Invention

In conventional radar sytems in which a volume in space is scanned and a mean level detector is utilized to apply signals to an azimuth integrator, large azimuth errors for detected targets are produced in the presence of external noise sources such as broad band noise jammers. This is caused by the azimuth integrating filter responding to the noise to cause substantial errors in the target azimuth estimation. Also, the difficulty of detecting targets in the presence of noise or noise jamming results in a highly variable noise false alarm rate. Some other problems associated with the operation of the conventional mean level detector are that it is relatively complex to implement (requiring a moving window memory in the range dimension) and that its accuracy is limited because valid targets contribute to the sample mean.

2. Description of the Prior Art

The prior art is adaptive mean level thresholding systems such as described by G. M. Dillard in "Mean Level Detection of Non-Fluctuating Signals", IEEE Trans. on Aerospace and Electronic Systems, Vol. AES-10, No. 6 November, 1974, pages 795-799. This paper describes the conventional mean level processor which uses a moving window in range for the accumulator and does not provide for exclusion of valid targets from the sample mean. Other prior art approach uses a ranking technique to exclude some, but not all, valid targets from the sample mean such as described by J. T. Rickard and G. M. Dillard, "Adaptive Detection Algorithms for Multiple-Target Situations", IEEE Trans. Aerospace and Electronic System, AES-13, June, 1977, pages 338-343. Thus, these prior art systems do not provide an arrangement that will satisfactorily estimate the background noise level and provide a constant false alarm rate (CFAR) when valid targets are present.

SUMMARY OF THE INVENTION

It is therefore an advantage of the invention to provide a radar detector system that reliably detects targets in the presence of large amplitude received noise with accurate estimation of the targets' azimuth.

It is a further advantage of this invention to provide a radar detection system that functions with a substantially constant false alarm rate in the presence of Rayleigh distributed noise interference such as countermeasures.

It is still another advantage of this invention to provide a system in which strong valid targets are excluded from the background noise level estimation process so as to allow the noise level to be accurately estimated even when strong valid targets are present.

It is another advantage of this invention to provide a system in which clutter returns can be excluded from the background noise level estimation process allowing the noise level to be accurately estimated even when clutter returns are present.

It is another advantage of the invention to provide a detector system that has a relatively simple mechanization and that has a relatively small sampling error when forming the mean level.

It is another advantage of this invention to provide a radar detector system that allows filter integration with the filter having a relatively small dynamic range.

It is still another advantage of this invention to provide a target detector system that provides good performance in both jamming and Rayleigh clutter environments by respectively controlling the noise level into the filter integrator and by providing a fast response to sudden changes in the noise level.

The adaptive zero mean false alarm control processor in accordance with the invention receives input sampled radar video data and provides to a target detector filter integrator, for example, a zero mean output independent of noise variability. The zero mean processor accumulates the sample video for a number of range cells T equal to the number of range cells in a range sweep. When this number of samples T is reached, the accumulated value is stored and the accumulator counter is reset. The stored value is scaled or divided by T to form an estimate of the mean and subtracted from the input video on the following sweep. The mean estimate is held until a new set of T samples is accumulated and a new mean value is derived for replacing the old mean value at the end of ranging or live time. In order to prevent the mean from being biased by strong targets, in one arrangement in accordance with the invention, a target exclusion function is provided which excludes targets larger than K times the previous noise mean. However, if the noise or jamming level has increased for a number of range bins greater than a target would occupy, the video is then again sampled since the change in level is due to a change in noise level rather than from a valid target.

BRIEF DESCRIPTION OF THE DRAWINGS

The novel features that are considered characteristic of this invention are set forth with particularity in the appended claims. The invention itself both to its organization and method of operation, as well as additional objects and advantages thereof, will best be understood from the following description when read in connection with the accompanying drawings in which like reference numbers refer to like parts and in which:

FIG. 1 is a schematic block diagram showing a radar and video processor system utilizing the zero mean processor in accordance with the invention;

FIG. 2 is a schematic diagram for explaining the azimuth sampling of the mean level detector;

FIG. 5 is a schematic diagram of waveforms showing voltage as a function of time for further explaining the operation of the system of FIG. 3; and FIG. 6 is a schematic diagram of video signal amplitude as a function of range for further explaining the zero mean subtraction operation in accordance with the invention.

DETAILED DESCRIPTION OF THE INVENTION

Figure 3:
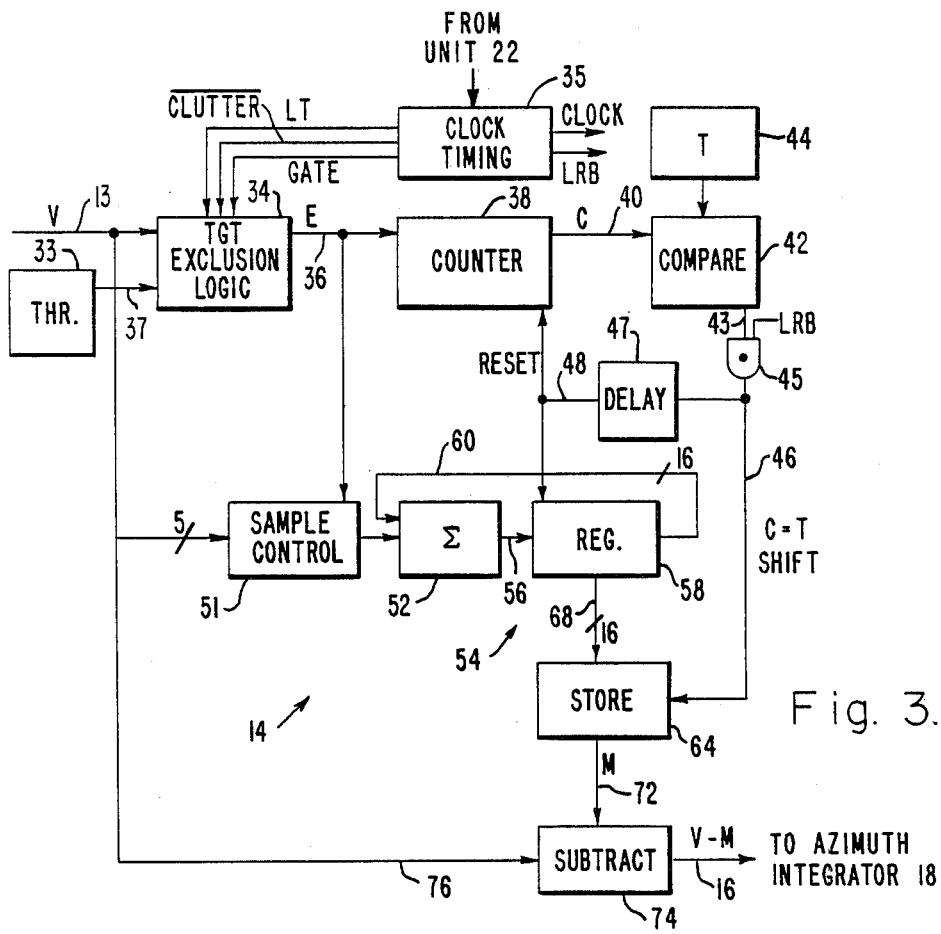
FIG. 3 is a schematic block diagram showing the mean level detector system in accordance with the invention.

Referring first to FIG. 1 which shows a radar video processing system utilizing the zero mean processor in accordance with the invention, a radar system 10 which may be a surveillance type radar system, applies logarithmic video signals to an A/D (analog to digital) converter 12 which in turn applies a digital video logarithmic signal V through a lead 13 to a zero mean processor 14. Because the log of a Rayleigh distribution derived from the envelope of bivariate Gaussian noise has only one component that changes with noise, that being the mean level, the mean level is accumulated, calculated and subtracted from the log video signal. Thus, if the noise power varies, only the mean varies and by subtracting this mean value from the video signal, a constant false alarm rate is provided. The system of the invention is very effective because noise energy such as weather clutter, chaff return, wide band nosie jammers and receiver noise all have a Rayleigh distribution after envelope detection. The zero mean processor of the invention samples a number of range bins equal to a complete azimuth range sweep to provide an accurate estimate of true average value and to avoid processing delays as are often required of conventional mean level detectors. The video signal with the mean level subtracted therefrom is then applied through a lead 16 to an azimuth integrator 18 which includes filter integrators and computes the center of the beam utilizing an offset at the completion of integration of the energy returned over a beam width. If the input noise to the azimuth integrator is modulated in azimuth when integrating across the beam width as with conventional systems, the variation of the integrated value with time varies so that the integrated amplitude is uneven causing considerable inaccuracy. For example, each beam width may include range sweeps from 20 to 40 azimuth positions which must be integrated prior to determining the beam center. The variability of the noise such as jamming would cause the integrated value to be inaccurate and cause errors in azimuth target determination, which variability is eliminated in the system of the invention. An example of an azimuth integrator is shown in FIG. 3 of U.S. Pat. No. 3,727,218, "Digital Radar Detector System", invented by Thomas C. Cantwell, Jr., et al. The signals provided by the azimuth integrator 18 are then applied to a mean level detector 20 which may be of a type that provides early and late range sampling of a few early and late range cells along each range sweep. An example of this type of mean level detector is shown in FIG. 3 of U.S. Pat. No. 3,720,942, "Video Processing System", by Richard D. Wilmot et al. Because the zero mean technique in accordance with the invention has a relatively slow response to sudden changes in the noise level, the conventional mean level detector 20 after the azimuth integrator and estimator provides a fast response in range to sudden changes in the noise level which, for example, may occur when clutter is present.

The mean level detector 20 samples a small number of range bins (such as 16 instead of the 256 utilized in the illustrated mean level detector) with a moving window integrator moving in range to provide a fast response to sudden changes in the noise level such as may occur with radar ground clutter. This combination of the zero mean technique for controlling the noise level into the filter and the range sampling mean level detector after the filter provide both good azimuth accuracy in jamming with a constant false alarm rate (CFAR) and a fast response to clutter changes. The output signal from the mean level detector 20 is then applied to a suitable utilization system such as a processor and display system 22 or to only a processing system or to a display system.

Referring now to FIG. 2, a circle 26 shows the 360°, for example, that may be covered by a typical surveillance type radar system transmitting a plurality of range sweeps at sequential azimuth positions. A range sweep 28 is shown as the on-time sweep and the entire number of range bins of a sweep are sampled (except in the presence of a target or other factors) to provide the average or mean level of the log video signals. A dotted radar range sweep 30 is the azimuth early sweep and provides a mean value for subtraction from each range bin of video data during the on-time sweep 28. It is to be noted that each range sweep may include 256 range bins and that the system operation is not limited to averaging the range bins from only one sweep but may average the range bins from two or more range sweeps depending on the target situation and on other parameters that may be utilized.

Referring now to FIG. 3, the zero mean processor system in accordance with the invention includes a target exclusion logic circuit 34 responsive to the digital log video voltage signals V on the lead 13 from the A/D converter 12 (FIG. 1) and a threshold signal and lead 37 from a threshold source 33 which in the illustrated system, provides a fixed value. The target exclusion logic circuit 34 may receive from a clock and timing source 35, the signals LT which represents live time for the zero mean processor, $\overline{CLUTTER}$ which represents a clutter condition determined from the processor and display unit 22 of FIG. 1, and a GATE signal which may be a manual or a computed signal from the processor 22 for eliminating short range clutter, for example. A count pulse E on a lead 36 which represents range bins of video that pass through the target exclusion logic circuit 34, are applied to a counter 38 which counts the number of range bins in which a target has not been found. A count C pulse is applied from the counter 38 on a lead 40 to a compare circuit 42, also receiving a fixed value T from a source 44 representing the number of range bins in a total range sweep. For example, T is 256 in the illustrated system. Upon a comparison, a signal is applied on a lead 43 to an AND gate 45 which also receives a last range bin pulse (LRB) from the clock and timing circuit 35 so that the sampled mean is only changed during the processor dead time. A shift pulse is provided to a lead 46 and after passing through a delay line 47 to a lead 48 is a reset pulse which resets the counter 38.

The log video signal V is also applied from the composite lead 13 to a sample control switch 51 and in turn to a summing unit 52 of an accumulator 54, the output of the summing unit 52 being applied to an accumulating register 58 through a composite lead 56. The output terminal of the register 58 is applied through a composite lead 56. The output terminal of the register 58 is applied through a composite feedback lead 60 to the input of the summing unit 52 so that during each or during several range sweep periods, the register 58 accumulates the integrated value of the signals in 256 range bins. The register 58 is reset in response to the reset pulse on the lead 48. The sample control switch 51 receives the E count signal from the lead 36 so that only in the absence of a target or other conditions preventing a count from occuring, the video signal from each range bin is applied to the accumulator 54. A store unit or memory 64 stores the accumulated mean from T range bins of the previous range sweep or sweeps to be utilized as a mean during the on-time range sweep period. When the shift pulse occurs on the lead 46, the stored mean in the register 58 is transferred into the store unit 64 through a composite lead 68 connected at the store unit 64 to provide a division by 256. Thus, the average of the accumulated mean M is applied through a composite lead 72 to a subtract circuit 74. At the leading edge of each clock time representing the beginning of a range bin, the log video signal V is applied from the lead 13 through a lead 76 to the subtract circuit 74 to provide a zero or constant mean signal V-M on the lead 16. A clock signal is provided by the clock and timing unit 35 for controlling the digital elements of FIG. 3 as is well known in the art.

Figure 4:
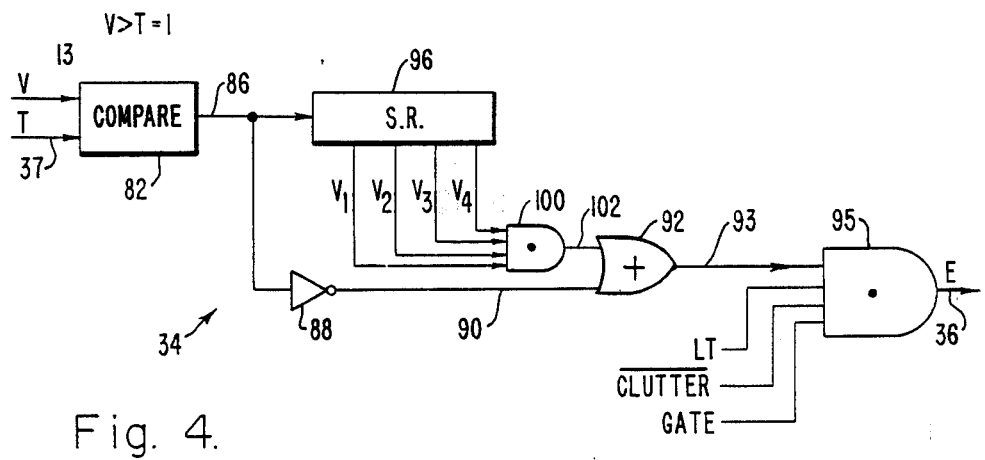
FIG. 4 is a schematic block and circuit diagram showing the target exclusion logic used in the system of FIG. 3.

Referring now also to the target exclusion logic circuit 34 of FIG. 4, a compare circuit 82 compares the amplitude of the log video signal V on the lead 13 with the threshold T on the lead 37, and if V does not exceed T a zero binary level is applied to an output lead 86. The zero level signal is applied through an inverter 88 to a lead 90 and in turn through an OR gate 92, a lead 93 and an AND gate 95 to provide the count pulse E on the lead 36. Thus, normally when the selected threshold is not exceeded, the counter 38 receives a count pulse during each clock time. The threshold value on the lead 37 represents a level of normal return in the absence of a target or an excessive noise level and may be a fixed value or a computed value in some arrangements in accordance with the invention. The lead 86 is also coupled to apply the binary bit on the lead 86 to the input of a shift register (SR) 96. If V is greater than T, the compare circuit 82 provides a binary one bit which is clocked into the shift register 96 but after passing through the inverter 88 does not provide an output from the OR gate 92. Each flip flop of the shift register 96, $V_1$, $V_2$, $V_3$ and $V_4$, is coupled as a separate input to an AND gate 100. Thus, in the presence of a target or a sudden increase in noise level, four binary ones must be shifted into the shift register 96 ($V_1$, $V_2$, $V_3$ and $V_4$) before the AND gate 100 is energized and a binary one is applied through a lead 102 and through the OR gate 92 and AND gate 95 to provide a count pulse E on the lead 36. The four range bins represent a distance in space slightly longer than the width of a target so that targets do not contribute to the accumulated mean because the sample control switch 51 is prevented by a binary one from passing the signal into the summer 52. However, if the video signal level has increased above the threshold for more than N times (4 times), the AND gate 100 remains energized and a count pulse E is applied to the counter 38 and to the sample control gate 51 so that the video is sampled by the accumulator 54. It is to be noted that if the signal noise level should drop for one clock period, $V_1$ becomes a zero bit and the AND gate 100 is not energized. However, when $V_1$ becomes a zero bit, a binary one is applied to the lead 90 to energize the OR gate 92 and provide an accumulation of the mean level. Thus, the target exclusion logic circuit allows strong noise levels to be sampled by the accumulator after N range bins so that the correct mean value is calculated for the noise while strong valid targets, which would cause an incorrect value to be estimated for the noise mean, are automatically excluded from the accumulator 54. The AND gate 95 also receives the signal LT so that a count only occurs during the processor live time, a signal $\overline{CLUTTER}$ so that a count only occurs during the absence of the determination by the processor 22 (FIG. 1) of a clutter condition, and a signal GATE which only occurs when a portion of near radar range, for example, is not gated out. It is to be noted that in accordance with the principles of the invention, the system may operate without the target exclusion logic circuit 34 and still provide a substantially accurate mean level.

Referring now to FIG. 5, as well as to FIGS. 3 and 4, a transmit pulse of a waveform 110 defines the pulses transmitted into space during each range sweep at each sequential azimuth position. A waveform 112 indicates the period during which accumulation of the mean occurs and the period may not necessarily occur during only one range sweep because of the occurrence of targets or other factors interrupting the accumulation. For example, at the periods after transmit pulses 109 and 111, the accumulation occurs during that azimuth sweep period, but after a transmit pulse 113 the accumulation of a count of 256 is not completed because of targets or other conditions applied to the AND gate 95 (FIG. 4) so that the accumulation is only completed after a transmit pulse 115. The shift and reset pulses of respective waveforms 116 and 118 are shown with a shift pulse occurring first to shift the contents of the register 58 into the store unit 64 with a division, followed by the reset pulse of the waveform 118 resetting the counter 38 and the accumulation register 58. The LT pulses of a waveform 120 which represent the live time for the zero mean processor defines a maximum accumulation period during each range sweep period. The LRB signals of a waveform 122 represents the last range bin of a range sweep and only allows the shift pulse to occur at that time although a comparison of C and T may occur earlier.

At a time $t_0$ the transmit pulse 109 transmits energy into space and at a time $t_1$, live video is applied to the zero mean processor as defined by the LT pulse of the waveform 120. Accumulation occurs until a time $t_2$ at which time since the count has reached 256 (for example a target has not been found), the shift pulse of the waveform 116 is formed to transfer a new mean into the store unit 64. After a short delay, the reset pulse of the waveform 118 is also formed. The operation is similar during the range sweep after the transmit pulse 111 as the total count T is reached. During the live time period between a time $t_4$ and a time $t_5$, the accumulation is not consistent as shown by the waveform 112 such as resulting from targets or clutter, and at the time $t_5$ the count of 256 has not been reached. Thus, at a time $t_6$, the accumulation continues and the count of 256 is reached at a time $t_7$. However, the shift pulse of the waveform 116 does not occur until a time $t_8$ and the reset pulse until a time $t_9$. Thus, only at the end of live time does a new mean replace the old mean value in the storage unit 64.

Referring now to FIG. 6, the noise return as log video is shown by a waveform 130 with the mean height of the noise being shown by an arrow 132 and with a target 134 protruding above the mean level. This noise is the log of the envelope of bivariate Gaussian noise and the mean value is the only variation with this type of noise. After subtracting the mean value, the target signal of a waveform 136 has a zero mean value. This zero mean noise does not provide variations in amplitude that degrade the azimuth accuracy of the azimuth integrator and further allows the azimuth integrator to have a greatly decreased dynamic range which simplifies the implementation of the integrator. Although the system has been illustrated to provide a zero mean level at zero volts, a similar operation could be performed at any bias level other than zero volts as long as the mean noise is cancelled. Further, it is to be noted that the concept of the invention is equally applicable for averaged linear video by providing a threshold that is a constant times the mean value rather than subtracting the mean value as in the illustrated system. Also, it is to be noted that the principal of the invention also includes operation without the target exclusion function because averaging an entire sweep of range bins provides a mean value that is useful for some types of systems.

What is claimed is:

1. A false alarm control system responsive to a source of radar video signals from a plurality of radar sweeps each having T range bins, said system forming a mean signal and providing a zero mean signal and comprising:
   sample control means coupled to receive said video signals;
   accumulator means coupled to said sample control means;
   target exclusion means responsive to said video signals for providing count pulses in response to said video signals, and coupled to control said sample control means to pass said video signals to said accumulator means in response to said count pulses;
   counter means coupled to said target exclusion means for providing a count of said count pulses;
   comparison means coupled to said counter means for comparing the count with T and providing a comparison signal and coupled to said counter means and to said accumulator means for providing a reset function;
   storage means coupled to said accumulator means and to said comparison means for storing the accumulated video signal scaled as a function of T to form said means signal; and
   subtractor means coupled to said source of radar video signals and to said storage means for providing said zero mean signal.

2. The combination of claim 1 in which said target exclusion means includes threshold comparison means responsive to a threshold and said video signals and includes target width determining means responsive to said threshold comparison means for providing said count pulses in the absence of a target.

3. The combination of claim 2 in which said target width determining means includes a shift register having an input coupled to said threshold comparison means and having a selected number of storage elements, an AND gate coupled to the outputs of said storage elements, an inverter coupled to the output of said threshold comparison means, and an OR gate coupled to said inverter and to said AND gate for providing said count pulses.

4. A false alarm control system responsive to a source of radar log video signals representative of the presence or absence of radar targets from a plurality of radar sweeps each having T range bins comprising:
   accumulating means for integrating said radar video signals to provide an accumulated value,
   count pulse forming means coupled to said source of log video signals for providing count pulses;
   counting means coupled to said count pulse forming means for counting said count pulses;
   comparison means coupled to said counting means for providing a reset pulse to said counting means and a shift pulse to said accumulating means after T radar log video signals are counted;
   storage means coupled to said accumulating means and responsive to said shift pulses for storing the mean value of the accumulated log video signals scaled as a function of T; and
   subtracting means responsive to said log video signals and to said stored mean value for providing a zero mean signal.

5. The combination of claim 4 in which said pulse forming means includes threshold comparison means for comparing the log video signals with a threshold level representative of a target and providing said count pulses when said log video signal is below said threshold level, and target width determining means responsive to said threshold comparison means for inhibiting count pulses for targets when said log video signal is above said threshold level.

6. The combination of claim 5 in which said accumulating means includes a sample control switch responsive to said count pulses.

7. A constant mean false alarm control system responsive to log video signals from a plurality of range bins along a radar range transmission sweep during a selected live time comprising:
   first comparison means responsive to said log video signal for forming a count signal when said video signal is above a threshold;
   counter means responsive to said count signal;
   accumulator means responsive to said log video signal and said count signal for accumulating said video signal in response to said count signals;
   storage means coupled to said accumulator means;
   a source of a reference value equal to the number of range bins per range sweep;
   second comparison means coupled to said counter means and to said source of a reference value for determining when the count is equal to said reference value and coupled to said counter means, accumulator means and storage means for resetting said counter means and for transferring a mean value to said storage means; and
   subtractor means coupled to said storage means and responsive to said log video signals for providing a constant mean output signal.

8. The combination of claim 7 in which means is coupled between said first comparison means and said counter means for controlling said count signal to occur only during the live time of said range sweep.

9. The combination of claim 7 in which said first comparison means includes target exclusion means responsive to said log video signals so that said count signal is inhibited in the presence of received target signals.

10. The combination of claim 9 in which said target exclusion means includes means to distinguish a change in noise level from a target signal and provide said count signals.

* * * * *